United States Patent
Engler

(10) Patent No.: US 6,693,809 B2
(45) Date of Patent: Feb. 17, 2004

(54) DEVICE FOR EQUAL-RATED PARALLEL OPERATION OF SINGLE-OR THREE-PHASE VOLTAGE SOURCES

(75) Inventor: Alfred Engler, Kassel (DE)

(73) Assignee: Institut fuer Solare Energieversorgungstechnik (ISET) Verein an der Universitaet Gesamthochschule Kassel e.V., Kassel (DE)

( * ) Notice: Subject to any disclaimer, the term of this patent is extended or adjusted under 35 U.S.C. 154(b) by 1 day.

(21) Appl. No.: 10/222,310

(22) Filed: Aug. 16, 2002

(65) Prior Publication Data

US 2003/0039132 A1 Feb. 27, 2003

(30) Foreign Application Priority Data

Aug. 21, 2001 (DE) .......................................... 101 40 783

(51) Int. Cl.$^7$ .............................................. H02M 7/00
(52) U.S. Cl. ........................................................ 363/71
(58) Field of Search ........................ 307/58, 92; 363/65, 363/71

(56) References Cited

U.S. PATENT DOCUMENTS

| | | | | |
|---|---|---|---|---|
| 3,852,655 A | * | 12/1974 | Justice | 363/48 |
| 3,978,393 A | * | 8/1976 | Wisner et al. | 323/272 |
| 4,313,155 A | * | 1/1982 | Bock et al. | 363/21.08 |
| 5,436,512 A | * | 7/1995 | Inam et al. | 307/58 |
| 5,875,103 A | * | 2/1999 | Bhagwat et al. | 363/17 |
| 6,031,747 A | * | 2/2000 | Ilic et al. | 363/71 |
| 6,118,680 A | | 9/2000 | Wallace et al. | |

FOREIGN PATENT DOCUMENTS

DE 199 49 997 A1 6/2001

OTHER PUBLICATIONS

Heinz Van Der Broeck, Ulrich Boecke: "A Simple Method for Parallel Operation of Inverts", Philips Research Laboratories Aachen, Weisshausstrasse 2, 52066 Aachen, Germany 803–5069–3/98–1998IEEE, pp. 143–150.

J. Holtz, W. Lotzkat: "Multi–Inverter UPS System with Redundant Load Sharing Control", IEEE Transactions on Industrial Electronics, vol. 37, No. 6, Dec. 1990, pp. 506–513.

A. Tuladhar., et al: "Parallel Operation of Single Phase Inverters . . . ", IEEE Applied Power Electronics Conference and Expositions, APEC' 97, vol. 1, pp. 94–100.

Schaefer: "Elektrische Kraftwerktechnik", Stringer–Verlag Berlin–Heidelberg, 1979pp. 98–108.

B. Burger: "Transformatorloses Schaltungskonzept . . . ", Dissertation, Karlsruhe, Jan. 1997, pp. 110–114.

W. Leonhard: "Control of Electrical Drives", Springer–Verlag Berlin–Heidelberg, 2. Auflage, 1996, pp. 262–264.

* cited by examiner

Primary Examiner—Adolf D. Berhane
(74) Attorney, Agent, or Firm—Michael J. Striker

(57) ABSTRACT

A device for equal-rated parallel operation of at least two inductively coupled inverters without additional synchronisation and/or communication lines is described. Each inverter is provided respectively with a control circuit which is intended to control its output voltage, to which control circuit a reference voltage ($u_{ref}$) is supplied as desired voltage, the frequency (f) of which is derived from the active power (P) taking into account preselected frequency statics and the amplitude ($|u|$) of said reference voltage being derived from the reactive power (Q) of the relevant inverter (1, 2) taking into account preselected voltage statics. According to the invention a value for the phase ($\phi$) of the reference voltage ($u_{ref}$) is also derived from the active power (P) taking into account a preselected weighting coefficient (St1') by which oscillations and build-ups of the active power components can be avoided.

5 Claims, 4 Drawing Sheets

Frequency statics

Voltage statics

Figure 1:
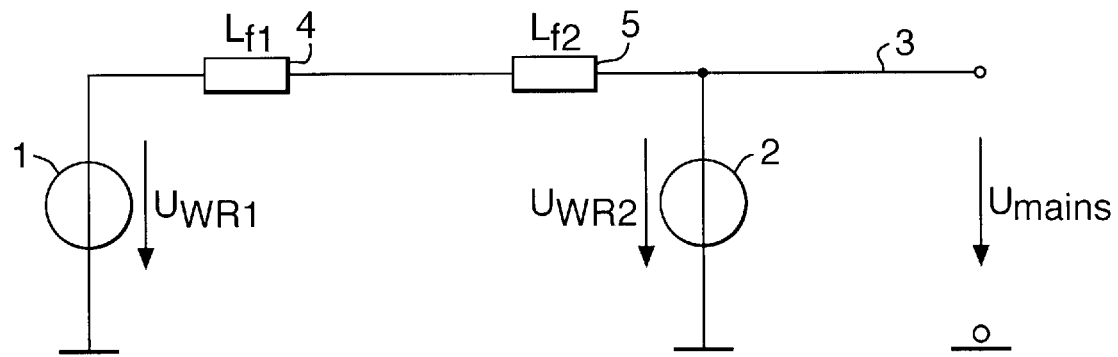

DEVICE FOR EQUAL-RATED PARALLEL OPERATION OF SINGLE-OR THREE-PHASE VOLTAGE SOURCES

The invention relates to a device for equal-rated parallel operation of inductively coupled inverters, which are connected to a common supply line via network coupling impedances, each inverter being provided respectively with a control circuit which is intended to control its output voltage, to which control circuit a reference voltage is supplied as desired voltage, the frequency of which is derived from the active power taking into account preselected frequency statics and the amplitude of said reference voltage being derived from the reactive power of the relevant inverter taking into account preselected voltage statics.

Devices for equal-rated (democratic) parallel operation of a.c. voltage sources are desired above all for constructing modularly extendable, decentralised electrical supply systems, since they make possible a simple increase in the system power and system reliability (n–1 redundancy). It is understood by "equality of rating" that each a.c. voltage source forms the network with a sinusoidal voltage of for example 230 $V_{\mathit{eff}}$ at a frequency of for example 50 Hz and contributes to the supply. In addition to the redundancy resulting therefrom, a simple installation should in addition be possible.

In particular inverters are possible here as a.c. voltage sources which generate a controlled a.c. voltage or can set a prescribed a.c. voltage (normally 50 Hz, 230 $V_{\mathit{eff}}$). This can concern single- or three-phase inverters, the output voltages of which are controlled by a pulse width control and which obtain their input d.c. voltages, for example from solar cells, fuel cells, batteries or the like. Subsequently, all the a.c. voltage sources which are relevant here are combined in brief with the description "inverters".

In the case of the devices applied to date for these purposes, a complete equality of rating of the inverters has not always been present. This applies for example to systems which are constructed from a single voltage source and a plurality of current sources. Systems of this type require not only additional lines for the exchange of information, which is undesirable, but are also not redundant because both the failure of the voltage source and also a defective exchange of information leads to a network closedown [1]. The same applies for known systems, in which in fact the network is formed exclusively from inverters operated as voltage sources, but in which these are synchronised by a master voltage source so that a fault in the synchronisation system can lead to network interruption [2].

In addition, it is known to change the frequency and the voltage of inverters in accordance with their active and reactive power with the help of statics which are known from the interlinking (interconnection) network. As a result, a complete equality of rating of the inverters can in fact be achieved but other problems arise during the production thereof.

For example, the operation of inverters with statics which are not network-compatible is known which implies that, as a result of the ohmic coupling of the voltage sources, the active power depends upon the voltage [P(u)] and the reactive power upon the frequency [Q(f)] [3]. Of disadvantage here is the principal-conditioned imprecision of the active power distribution which can be influenced for example also by the connection lines.

Finally, devices of the initially described type are known which operate with network-compatible statics [4]. Network-compatible implies here that, according to FIG. 1, at least two inverters 1 and 2 as in the case of normal interlinking networks are coupled inductively with a supply line 3 and that therefore the active power depends upon the phase φ and via this upon the frequency [P(f)], and the reactive power depends upon the voltage [Q(u)].

Typically very small network coupling impedances 4 and 5 of for example 0.8 mH are thereby provided as inductances which operate rapidly and are economical.

It is essential for equal-rated parallel operation of inverters in the case of devices of this type initially that
  all involved inverters require an identical frequency,
  only small voltage difference are permitted between the inverters, and
  the phase differences between the inverters must be very small.

In addition, it is a prerequisite that each inverter requires its own voltage- and frequency reference, if additional synchronisation and/or communication lines are intended to be dispensed with. However, a problem resides in the fact that known references (for example quartz oscillators) do not have negligible tolerances for this application case. Ageing effects, faults in the current and voltage detection, temperature dependencies or the like lead to imprecisions with the result that the output voltage of each inverter must be controlled, for the purpose of which only the temporal course of its output voltage $u_{actual}$ and of its current $i_{actual}$ is available.

Figure 2:
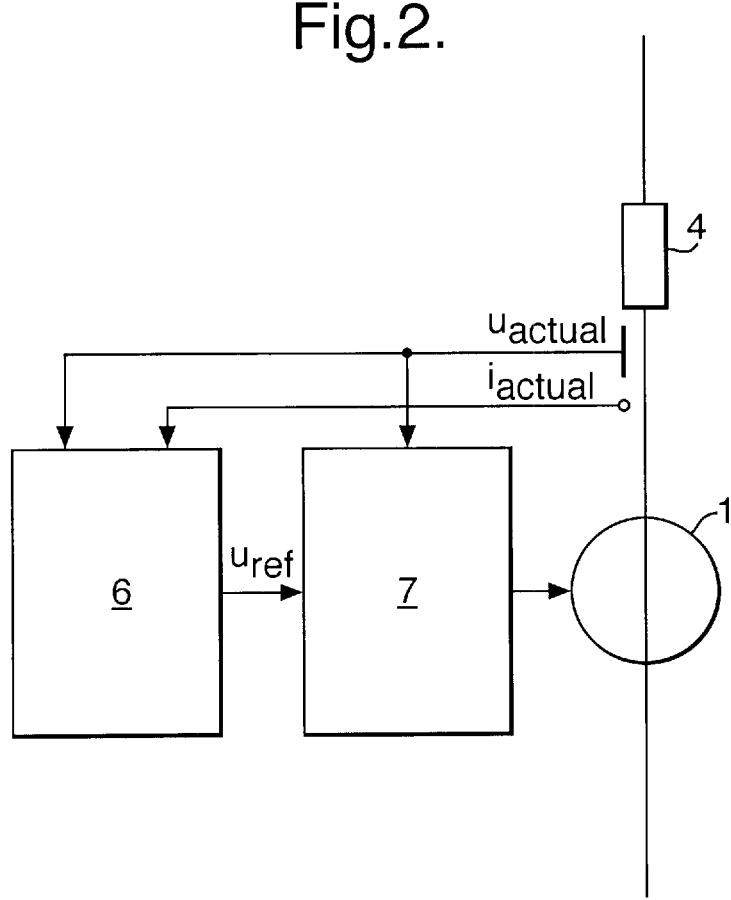

In the case of the initially described, known device [4], the control of the voltage of each inverter 1, 2 is effected with a control device according to FIG. 2. The main item of such a control device is a unit 6 with two inputs, to which the actual values of the voltage $u_{actual}$ or of the current $i_{actual}$ of the respective inverter, here the inverter 1, are supplied. This unit 6 determines a reference voltage $u_{ref}$, which is determined according to frequency and amplitude, using frequency- and voltage statics, said reference voltage serving in a control circuit 7 for the inverter 1 as command variable or nominal or desired value. By comparing the reference voltage $u_{ref}$ with the respective actual voltage $u_{actual}$ of the inverter 1, a signal for controlling the relevant inverter 1 is derived, which normally comprises an adjustment signal for its pulse width.

Figure 3:
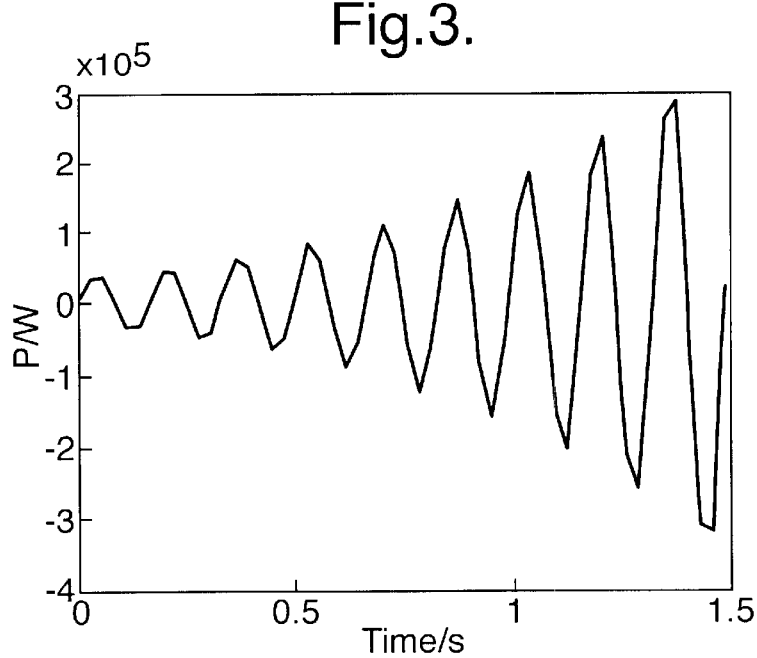

A disadvantage of the known device resides in the fact that it can be operated only with relatively flat frequency statics which, because of the tolerances of the available quartzes and of other components, lead to difficulties in implementation and hence cannot be converted industrially. On the other hand, if realistic, steeper statics are used, these then lead to power pendulum oscillations between the parallel-connected inverters and hence to instabilities, such as are illustrated in FIG. 3 by way of example.

Starting from the above an object underlying this invention is to configure the device of the initially described type such that comparatively steep statics can be used.

A further object is to configure the device of the initially described type such that hunting and build up of the active power components is effectively avoided even if comparatively steep statics are used.

A further object of this invention is to design the device such that additional synchronisation and communication lines can be avoided.

Yet another object is to propose a device of the initially described type wherein oscillations and build-ups of the active power components are remarkably reduced if steeper statics are used.

These and other objects are solved by the invention in that a value for the phase of the reference voltage is also derived from the active power taking into account a preselected weighting coefficient.

The invention includes the surprising advantage that the instabilities mentioned with reference to FIG. 3 can be entirely avoided by the additional consideration of the phase during the control of the inverters. As is explained subsequently in more detail with reference to a preferred embodiment, there are obtained rather, even with use of comparatively steep frequency or active power statics, stationary active power values even after a short transient process. As a result, the substantial advantage is produced that the active power statics can be established in more or less any manner.

Further advantageous features of the invention are produced from the sub-claims.

Figure 4:
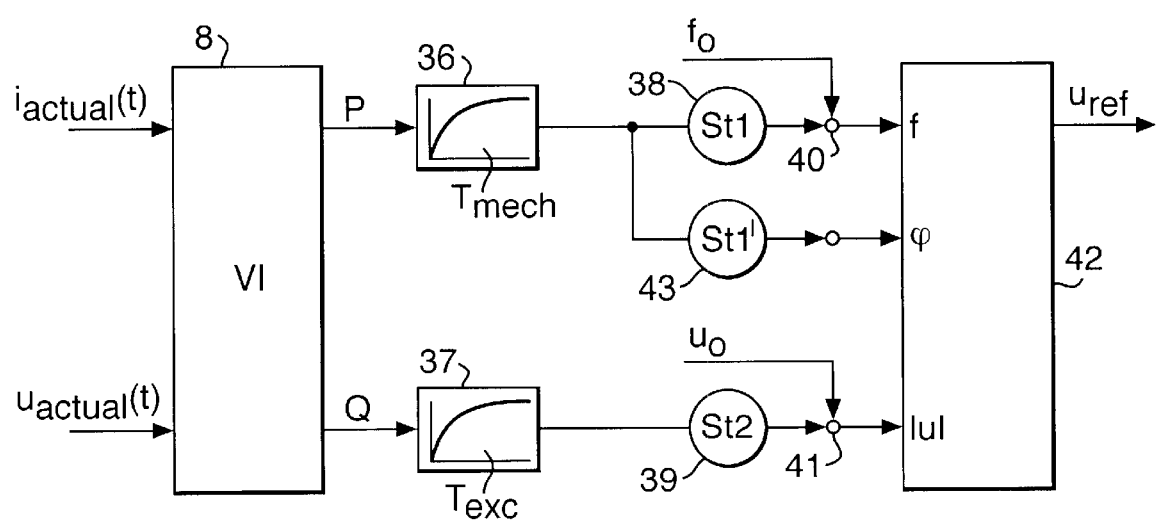
Figure 5:
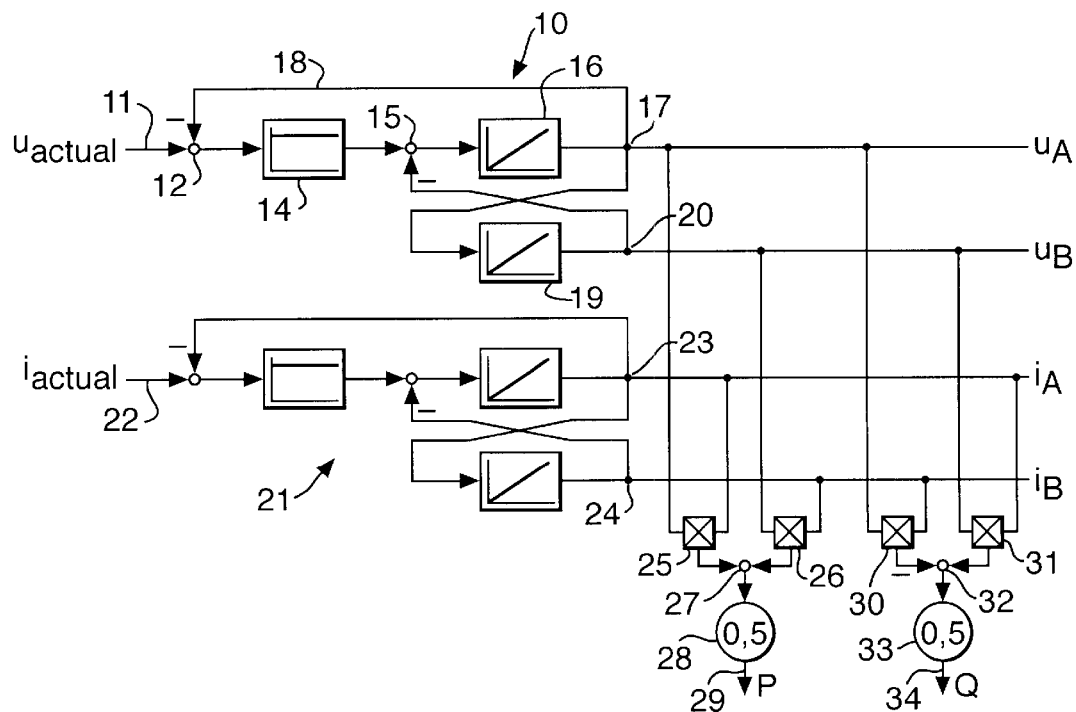
Figure 6:
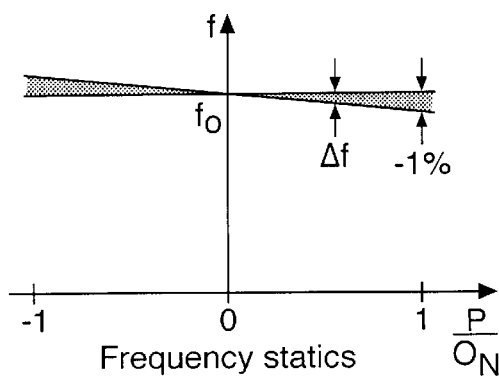
Figure 7:
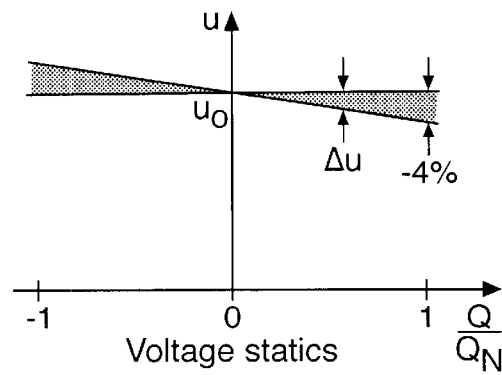
Figure 8:
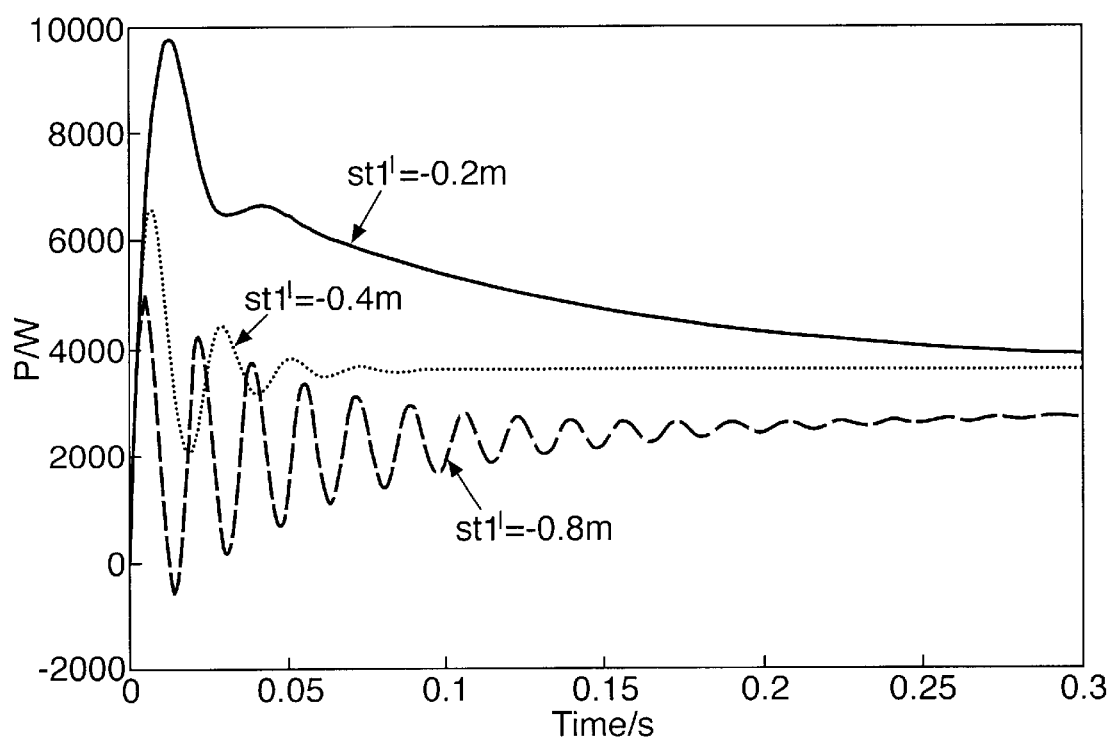

The invention is explained subsequently in more detail with one embodiment in combination with the enclosed drawings. There are shown:

FIG. 1 the schematic illustration of a device with two a.c. voltage sources, which are configured as inverters, in parallel operation;

FIG. 2 a block wiring diagram of a control device for one of the inverters according to FIG. 1;

FIG. 3 the unstable behaviour of both inverters according to FIG. 1 during application of a known voltage regulator;

FIG. 4 the block wiring diagram of an embodiment according to the invention of a unit of the control device according to FIG. 2, which unit serves to produce a reference voltage;

FIG. 5 a preferred arrangement for determining the active and reactive powers in the unit according to FIG. 4;

FIGS. 6 and 7 the course respectively of frequency and voltage statics used in the unit according to FIG. 4; and FIG. 8 the stable behaviour of the inverters according to FIG. 1 when using the unit according to the invention according to FIG. 4.

FIG. 4 shows the configuration according to the invention of a unit 6 of the control device according to FIG. 2, which unit is intended to produce the reference voltage $u_{ref}$. The unit 6 contains a block 8 with two inputs, the signal $u_{actual}$ (t) being supplied to the one input and the signal $i_{actual}$ (t) to the other input. In addition, the block 8 has two outputs, the signal P of the active power appearing at the one output and the signal Q of the reactive power appearing at the other output. Furthermore, the block 8 is configured in the case of single-phase systems preferably as an arrangement, which serves for rapid and precise determination of the values P and Q by means of special filters, said arrangement being illustrated schematically in FIG. 5 and known per se (DE 199 49 997 A1). The high measuring speed which is possible as a result permits a rapid control of the inverters 1 and 2 and avoids the occurrence of excess currents.

FIG. 5 shows schematically a special filter 10, which is suitable for the purposes of the invention for providing a signal which is essentially phase-displaced by 90° relative to a first periodic input signal. The filter 10 contains an input 11 which is connected via a first summing element 12, a proportional element 14 and a second summing element 15 to the input of a first integrating element 16. The output 17 of element 16 is guided back via a connection 18 and the first summing element 12 to the input of the proportional element 14. In addition, the filter 10 has a second integrating element 19 which is connected to the first integrating element 16, the two integrating elements 16, 19 forming two coupled integration stages. For this purpose, an output 20 of the integrating element 19 leads to the second summing element 15, whilst in reverse the output 17 of the first integrating element 16 is coupled back to the input of the second integrating element 19. The two integration stages 16, 19 operate with an amplification which corresponds to the cycle frequency $\omega_N$ of the fundamental oscillation of the first signal (e.g. 314 at 50 Hz).

Consequently, the filter 10 is equipped such that a sinusoidal input signal, for example the voltage $u_{actual}$, corresponds at the input 11 in amplitude, frequency and phase position essentially with a sinusoidal signal $u_A$ at the output 17 of the first integrating element 16 provided that the filter is in steady state. In the non-steady or not yet steady state, a fault signal is produced by contrast at the first summing element 12, said fault signal being amplified in the proportional element 14 by a preselected factor and subsequently being guided to the integrating element 16 via the second summing element 15. As a result the amplified fault signal is integrated until it becomes zero based on the reverse feedback of the output 17 to the first summing element 12 and hence the filter 10 is in steady state. A signal $u_B$ at the output 20 of the second integrating element 19 is produced by the integration of the signal $u_A$ at the output 17 of the first integrating element 16. Since the integration of a sinusoidal signal $u_A$ produces a phase displacement of essentially 90°, the signal $u_B$ is orthogonal to the signal $u_A$, i.e. essentially identical in amplitude and frequency but displaced essentially by 90° in phase.

With the amplification factor of the proportional element 14, a damping is set which is expressed by the speed at which the measuring results are determined. The amplification factors of the integrating elements 16, 19 thereby adjust the operating frequency of the filter 10. In the case of energy supply systems this is for example 50 Hz. In addition, any possible interferences are suppressed by the filter effect of the filter 10, in particular those which concern signals with a frequency which deviates from the resonance frequency.

According to FIG. 5, the block 8 has a second filter 21, corresponding to the filter 10, with an input 22 to which the signal $i_{actual}$ is supplied so that the filter 21 at outputs 23 and 24 issues signals $i_A$ and $i_B$ which are phase-displaced by 90°.

For the purposes of the invention, the active power is defined in complex notation by the formula $$P(t) = \tfrac{1}{2}(u_A \cdot i_A + u_B \cdot i_B)$$

and the reactive power by the formula $$Q(t) = \tfrac{1}{2}(u_B \cdot i_A - u_A \cdot i_B)$$

For the purposes of the present invention, the determination of the values P and Q is therefore effected in that a computer circuit connected to the outputs 17, 20 or 23, 24 is connected in series to the filters 10, 21. The computer circuit contains on the one hand a multiplication element 25 connected to the outputs 17, 23 and on the other hand a multiplication element 26 connected to the outputs 20, 24. The consequently obtained products, $u_A \cdot i_A$ and $u_B \cdot i_B$ are added in a subsequent summing element 27 and the obtained sum is multiplied by a proportional element 28 by the factor 0.5. At the output 29 of the proportional element 28 there appears therefore the active power P corresponding to the above formula. Correspondingly, the outputs 17, 24 on the one hand or 20, 23 on the other hand are connected respectively to one multiplication element 30 or 31, the output sizes of which $u_A \cdot i_B$ or $u_B \cdot i_A$ are subtracted at a summing element 32 and multiplied by a series-connected proportional element 33 by the factor 0.5. As a result, the reactive power Q is obtained at the output 34 of the proportional element 33 corresponding to the above formula.

In contrast, in the case of three-phase systems, the complex input sizes u and i are available, from which input sizes the required outputs P and Q can be directly calculated. An alternative possibility in this case would also be the thrice-repeated application of the above described single-phase measuring arrangement per phase and the determination of P and Q from the arithmetic averages of the respective phase powers according to $$P=(P_1+P_2+P_3)/3$$

and $$Q=(Q_1+Q_2+Q_3)/3.$$

The P and Q values obtained with the arrangement according to FIG. 5 are supplied respectively to a de-coupling network 36, 37 (FIG. 4) which comprises essentially a time-lag device of a first order. These decoupler networks 36, 37 are introduced in order to decouple the active and the reactive power control during current changes which are more rapid than one network period. They are also necessary for keeping constant the frequency and the voltage in the case of non-linear loads (for example rectifiers) or in the case of out-of-balance in the three-phase case, since the P or Q determination in these cases delivers pulsing results. The chosen descriptions of the time-lags should be clarified by analogy to a machine. Here the moment of inertia ($T_{mech}$) and the excitation time constant ($T_{exc}$) have a similar smoothing effect. The size of the time-lag to be chosen is a compromise between overload capacity of the power converters, which demands a non time-lag control in order to avoid high compensating currents, and desired smoothing the case of non linear loads or with out-of-balance.

The P or Q values, which are time-lagged in this manner, are supplied respectively to a multiplication stage 38 or 39 and in these are multiplied by the values St1 or St2 which correspond to the gradients of statics according to FIGS. 6 and 7 and hence have the dimensions Hz/W or 1/A. The output values of the multiplication stages 38, 39 are supplied respectively to an addition stage 40, 41 in which they are added with prescribed frequency or voltage values which are supplied via respectively a second input and are here for example $f_o$=50 Hz and $u_o$=230 $V_{eff}$. The output values of the addition stage 40 thereby represent a frequency reference and the output values of the addition stage 41 represent a voltage reference in the form of an absolute quantity for the amplitude. From both values, the reference voltage $u_{ref}$, which can also be seen in FIG. 2 is derived finally in a block 42.

The frequency statics which can be seen in FIG. 6 indicate the inter-connection between f and P. Correspondingly, FIG. 7 shows the voltage statics, i.e. the dependency of the reactive power Q upon the voltage u. In the case of FIGS. 6 and 7, the values which are standardised to the nominal power $P_N$, $Q_N$ are indicated thereby along the abscissae instead of P and Q. Thus for example in FIG. 6 a theoretical change in power P from no-load to nominal power implies a change of frequency by 1% (0.5 Hz), at the same time a positive P corresponding to a delivery of active power by the relevant inverter 1, 2 and a negative P correspondingly to a receipt of reactive power by the respective inverter 1, 2. In FIG. 7, a theoretical change of the reactive power Q from 0 to $Q_N$ implies analogously a change in the voltage by 4%. Hence a standardised gradient St1 of –0.01 Hz is produced in FIG. 6 and a standardised gradient St2 of –0.04 V in FIG. 7.

The operation of the described and partly known device [4] is essentially as follows:

Let it be assumed for the sake of simplicity that there is no load on the supply line 3 (FIG. 1). Because of the small network coupling impedances 4, 5, even the smallest differences in the output voltages of the inverters 1 and 2 result in relatively large currents between the latter. The (more rapid) inverter with the greater frequency thereby delivers active power, and the (slower) inverter with the smaller frequency receives active power, as is generally known from power station technology [5]. The control therefore has the effect according to FIG. 4 that a positive P because of the multiplication by a negative gradient St1 leads to a value which is subtracted from the value $f_o$ whilst in reverse a negative P results in an increase in the frequency $f_o$. As a result, the faster inverter delivering active power becomes slower and the slower inverter receiving active power becomes faster until an exact equalisation of the frequencies occurs and practically no more active power is exchanged, i.e. the current flowing between the inverters 1, 2 is minimal.

The reactive power control is effected analogously with the difference that, by means of the gradient St2, an amplitude reference is obtained instead of a frequency reference.

The production of the reference voltage $u_{ref}$ is effected in the block 42 according to the equation $$u_{ref}=|u|\cdot \sin(2\pi ft)$$

in the case of single-phase systems, $u_{ref}$ being a sinusoidal function of time.

The described procedure functions only in the case of flat frequency statics which are unrealistic in practice. In the case of steeper frequency statics the result is on the other hand power pendulum oscillations according to FIG. 3. Frequency statics of 1 Hz/$P_N$ are assumed in FIG. 3.

In order to avoid power pendulum oscillations of this type, it is provided according to the invention to supplement the unit 6 (FIG. 2) according to FIG. 4 by a negative weighting coefficient St1 which takes into account the phase $\phi$, said coefficient being indicated by the multiplication stage 43. As a result, the time-lagged P value of the active power is multiplied by a factor which delivers a value for the phase $\phi$ of the reference voltage $u_{ref}$. Thus $u_{ref}$ is now determined by f, |u| and $\phi$ which has a damping effect on the system, which favourably influences the resonance frequencies and prevents power pendulum oscillations according to FIG. 3. Surprisingly, this effect can also be achieved by applying comparatively large frequency statics so that as a result the possibility is offered of implementing the power control by means of realistic frequency statics which can be produced readily in practice.

The factor St1' leads to the fact that the reference voltage $u_{ref}$ in the single-phase case leads in the block 42 to the function $$u_{ref}=|u|\cdot\sin(2\pi ft+\phi)$$

whilst, in the three-phase case, a vector must be calculated for the voltage, |u| in polar coordinates being maintained as the length of the vector, whilst the angle $\rho$ of the vector being produced by the equation $$\rho=\int f dt+\phi.$$

Accordingly, the factor St1' has the dimension radians/w or degrees/w.

The voltage $u_{ref}$ is adjusted according to the invention in the case of the inverters 1, 2 with a phase- and amplitude-exact control, as is known per se both for the single-phase case [6] and also for the three-phase case [7]. Since the active power P is established by the phase $\phi$ in the case of inductively coupled inverters, the fact that said phase is taken into account which is additionally provided according to the invention for the control has the result that the active power changes immediately with the phase φ, i.e. there is no need to wait until a corresponding phase angle change has been set via the integration of a frequency error according to the equation φ=∫fdt, said phase angle change then for its part adjusting the active power. The taking into account of the phase φ according to the invention or the phase precontrol achieved therewith acts more rapidly in the control device and consequently has a damping effect.

In order that the required damping is produced, the factor St1' is negative. If therefore the value P at the output of the block 8 is positive, which corresponds to a positive phase angle then a negative φ is obtained via the multiplication stage 43 which leads via the phase precontrol to a reduction in the phase angle and hence to a reduction in the delivered power. Since preferably the same factor St1' is used in the case of all inverters, the phase precontrol has the effect in those inverters, which take up active power, of vice-versa reducing the active power take-up.

The factor St1' is determined in dependence upon the network impedances 4, 5 and the gradient St1 of the frequency statics, for example by an optimisation calculation. This is illustrated in FIG. 8 by way of example with three values for St1' which are −0.2 m, −0.4 m and −0.8 m, whilst frequency statics of 1% are used again analogously to FIG. 6. In addition it is assumed in order to simplify the representation that n parallel-connected inverters with a nominal power $P_N$ of respectively 3800 W are present, of which n−1 operate with a frequency of 50 Hz and 230 $V_{eff}$ whilst the $n^{th}$ inverter operates with a deviating frequency of $f_o$=51 Hz at likewise 230 $V_{eff}$. The gradient of the frequency statics (1%) is in the example hence St1=−1/3800 with the result that, when P=3800 W at the output of the block 8, an exact equalisation of the frequency to the frequency of the remaining n−1 inverters is obtained because $f_o$−1≈50 Hz. In other words, the $n^{th}$ inverter would need to deliver a power of 3800 W in a stable manner in order to achieve a Δf=0 in comparison to the remaining n−1 inverters.

The active power distribution of the various inverters is therefore always such that the frequency differences disappear. According to FIG. 8 this is achieved for example for St1'=−0.4 m. In this case, a stationary state corresponding to P=3800 W is achieved relatively rapidly, i.e. after a comparatively short transient process of approximately 100 ms. If St1' is set at −0.2 m, the stationary state sets in significantly later. In the case of St1'=−0.8 m, even comparatively strong active power pendulum oscillations must be taken into account analogously to FIG. 3, said active power pendulum oscillations only subsiding significantly after approximately 200 ms. By means of optimisation calculations or simulations, the value St1' which is expedient in an individual case can therefore be determined easily.

Correspondingly, the process can take place with the choice of other expedient frequency statics. It is however possible even in the case of comparatively steep frequency statics to prevent or at least to greatly reduce the pendulum oscillation of the active power between the inverters by means of phase intervention or by taking into account the phase φ in the control concept and hence to obtain a stationary active power value.

Only the introduction of the phase precontrol hence makes possible a stable operation even in the case of steep frequency statics. A stable power corresponding to the chosen frequency statics is set. The additional degree of freedom of the phase precontrol enables, with prescribed network coupling impedances of the inverters and prescribed, possibly technologically conditioned gradients of the frequency statics, the setting of a suitable transient behaviour of the inverters. In the case of negative frequency statics, St1' is likewise generally negative. The weighting coefficient St1' must be determined appropriately for a given gradient of the frequency statics and the network coupling inductance. This can take place for example by evaluation of the root locus curve of the supply system. A design criterion is the lowest energy requirement during synchronisation (for example St1'=−0.4 m in FIG. 8). The intrinsic system frequency also changes with the phase precontrol and must if necessary be adapted so that resonances in the entire system are avoided.

The conditions described previously for a case without a load in the supply line 3 (FIG. 1) are produced analogously for the case where a consumer is connected to the supply line 3.

The invention is not restricted to the described embodiment, numerous modifications thereof being possible. In particular the sizes indicated in FIGS. 6 to 8 should be understood merely as examples which can be modified dependent upon the individual case.

It will be understood that each of the elements described above, or two or more together, may also find a useful application in other types of devices of equal-rated operation differing from the types described above.

While the invention has been illustrated and described as embodied in a device for operation of single-phase voltage sources it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

LITERATURE

[1] Heinz van der Broeck, Ulrich Boeke: "A Simple Method for Parallel Operation of Inverters", Philips Research Laboratories Aachen, Weisshausstraβe 2, 52066 Aachen, Germany (803-5069-3/98-1998 IEEE)
[2] J. Holtz, W. Lotzkat: "Multi-inverter UPS system with redundant load sharing control", IEEE Transactions on Industrial Electronics, 1990
[3] Wallace et al.: "Methods and Apparatus for Load Sharing between parallel inverters in an AC-power supply", U.S. Pat. No. 6,118,680
[4] A. Tuladhar, H. Jin, T. Unger, and K. Mauch, "Parallel Operation of Single Phase Inverters with no Control Interconnections," IEEE Applied Power Electronics Conference and Exposition APEC '97, Vol. 1, pp 94–100
[5] H. Schaefer: "Elektrische Kraftwerkstechnik", Stringer-Verlag Berlin-Heidelberg, 1979
[6] B. Burger: "Transformatorloses Schaltungskonzept für ein dreiphasiges Inselnetz mit Photovoltaik und Batteriespeicher", Dissertation, Karlsruhe 1997
[7] W. Leonhard: "Control of Electrical Drives", Springer-Verlag Berlin-Heidelberg, 2. Auflage, 1996

What is claimed as new is set fourth in the following appended claims.

What is claimed is:

1. Device for equal-rated parallel operation of inductively coupled inverters (1, 2), comprising a common supply line (3) to which said inverters (1,2) are connected via network coupling impedances (4,5), each inverter (1,2) being provided respectively with a control circuit (7), which is intended to control its output voltage, a reference voltage ($u_{ref}$) being supplied as desired voltage to said control circuit (7), wherein a frequency (f) of said reference voltage ($u_{ref}$) is derived from an active power (P) of a relevant inverter (1,2) taking into account preselected frequency statics, wherein an amplitude (|u|) of said reference voltage is derived from a reactive power (Q) of said relevant inverter (1,2) taking in to account preselected voltage statics, and wherein a value for a phase ($\phi$) of said reference voltage is also derived from said active power (P) taking into account a preselected weighting coefficient (St1').

2. Device according to claim 1, wherein said preselected weighting coefficient (St1') is the same in all of the inverters (1, 2).

3. Device according to claim 1, wherein said weighting coefficient (St1') is obtained by an optimisation calculation.

4. Device according to claim 1, wherein actual values of said active and reactive power (P, Q) are obtained in that, from first signals ($u_A$, $i_A$), which correspond to said actual values ($u_{actual}$, $i_{actual}$) of a voltage and of a current of said relevant inverter (1, 2), that a second signal ($u_B$, $i_B$), which is essentially identical but is phase-displaced by 90°, is determined respectively by integration and that said first signals ($u_A$, $i_A$) are interpreted as real parts and said second signals ($u_B$, $i_B$) are interpreted as imaginary parts of vectors of said voltage or of said current.

5. Device according to claim 4, wherein a decoupling network (36, 37) respectively is connected in series to outputs delivering said actual values of said active and reactive power (P, Q).

\* \* \* \* \*